(12) United States Patent
Wilson et al.

(10) Patent No.: US 8,549,577 B2
(45) Date of Patent: *Oct. 1, 2013

(54) METHODS AND APPARATUS FOR FREQUENCY AGILE BAND-PASS FILTERING OF BROADCAST SIGNALS

(71) Applicant: AT&T Intellectual Property I, L.P., Atlanta, GA (US)

(72) Inventors: Brian Wilson, Liberty, MO (US); Frank Robert Coppa, North Kansas City, MO (US); Douglas Medina, Grain Valley, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/742,997

(22) Filed: Jan. 16, 2013

(65) Prior Publication Data
US 2013/0132991 A1 May 23, 2013

Related U.S. Application Data

(63) Continuation of application No. 12/175,922, filed on Jul. 18, 2008, now Pat. No. 8,370,890.

(51) Int. Cl.
*H04N 7/173* (2011.01)
*H04N 5/52* (2006.01)

(52) U.S. Cl.
USPC .................. 725/127; 725/119; 348/683

(58) Field of Classification Search
USPC ..................... 725/119, 127; 348/683
See application file for complete search history.

(56) References Cited

U.S. PATENT DOCUMENTS

| | | | |
|---|---|---|---|
| 4,228,402 A | 10/1980 | Plummer | |
| 4,941,199 A | 7/1990 | Saam | |
| 5,579,367 A | 11/1996 | Raymond et al. | |
| 5,839,052 A | 11/1998 | Dean et al. | |
| 5,943,604 A | 8/1999 | Chen et al. | |
| 6,307,833 B1 | 10/2001 | Barker et al. | |
| 6,359,944 B1 | 3/2002 | Curtis, III et al. | |
| 6,567,118 B1 | 5/2003 | Al-Araji et al. | |
| 6,587,687 B1 | 7/2003 | Wiedeman | |

(Continued)

OTHER PUBLICATIONS

"Trilithic Tunable Bandpass Filters," Trilithic, Inc., 2008 (6 pages).

(Continued)

*Primary Examiner* — James R Sheleheda
(74) *Attorney, Agent, or Firm* — Hanley, Flight & Zimmerman, LLC

(57) ABSTRACT

Example frequency agile band-pass filtering methods disclosed herein include monitoring reception quality of a media broadcast signal received at a headend including a frequency agile band-pass filter to receive the media broadcast signal, sending a first set of commands to cause the frequency agile band-pass filter to tune to and attenuate a first channel included in the media broadcast signal, the first set of commands being sent in response to determining that the first channel is experiencing a degradation of reception quality determined to be caused by a first type of channel interference, and sending subsequent second set of commands over the communication network to the frequency agile band-pass filter to override attenuation processing invoked by the first set of commands in response to determining that the degradation of reception quality is caused by fading in addition to the first type of channel interference.

20 Claims, 6 Drawing Sheets

(56) References Cited

U.S. PATENT DOCUMENTS

| | | |
|---|---|---|
| 6,857,013 B2 | 2/2005 | Ramberg et al. |
| 7,039,432 B2 | 5/2006 | Strater et al. |
| 7,317,698 B2 | 1/2008 | Jagger et al. |
| 7,602,820 B2 | 10/2009 | Helms et al. |
| 7,710,503 B2 | 5/2010 | Pugel et al. |
| 7,830,992 B2 | 11/2010 | Ao |
| 7,853,227 B2 | 12/2010 | Stevenson et al. |
| 7,869,528 B2 | 1/2011 | Robinson |
| 8,370,890 B2 * | 2/2013 | Wilson et al. .......... 725/127 |
| 2002/0154620 A1 | 10/2002 | Azenkot et al. |
| 2004/0041945 A1 | 3/2004 | Pugel et al. |
| 2004/0111742 A1 | 6/2004 | Hendricks et al. |
| 2006/0148406 A1 | 7/2006 | Strater et al. |
| 2007/0104097 A1 | 5/2007 | Rassool et al. |
| 2007/0206525 A1 | 9/2007 | Miller et al. |
| 2008/0077964 A1 | 3/2008 | Hamilton |
| 2009/0310031 A1 | 12/2009 | Pugel et al. |
| 2010/0017835 A1 | 1/2010 | Wilson et al. |

OTHER PUBLICATIONS

Rhodes, Charles W., "Unmasking the Threat of Adjacent Channels," Apr. 2, 2008 (3 pages).

USPTO, "Office Action," issued in connection with U.S. Appl. No. 12/175,922, dated Jan. 19, 2011 (16 pages).

USPTO, "Final Office Action," issued in connection with U.S. Appl. No. 12/175,922, dated Jun. 28, 2011 (19 pages).

USPTO, "Office Action," issued in connection with U.S. Appl. No. 12/175,922, dated May 21, 2012 (14 pages).

USPTO, "Notice of Allowance," issued in connection with U.S. Appl. No. 12/175,922, dated Oct. 5, 2012 (6 pages).

* cited by examiner

METHODS AND APPARATUS FOR FREQUENCY AGILE BAND-PASS FILTERING OF BROADCAST SIGNALS

RELATED APPLICATION(S)

This patent arises from a continuation of U.S. application Ser. No. 12/175,922, entitled "METHODS AND APPARATUS FOR FREQUENCY AGILE BAND-PASS FILTERING OF BROADCAST SIGNALS" and filed on Jul. 18, 2008, which is hereby incorporated by reference in its entirety.

FIELD OF THE DISCLOSURE

This disclosure relates generally to signal filtering and, more particularly, to methods and apparatus for frequency agile band-pass filtering of broadcast signals.

BACKGROUND

Many broadcast systems employ one or more headend sites (also known as headends) to receive broadcast signals from multiple sources and/or on multiple channels to facilitate redistribution of the broadcast signals to subscribers and/or other reception sites over a common transmission medium. For example, a typical Internet Protocol Television (IPTV) system employs at least one headend to receive Advanced Television Systems Committee (ATSC) broadcast signals on one or more broadcast channels for redistribution via a digital Internet Protocol (IP) network. The digital format of ATSC broadcasts, as well as the redistribution of their content via a digital IP network, offers the promise of improved signal quality over traditional National Television System Committee (NTSC) analog broadcasts. However, the quality of ATSC broadcast content, like other types of content conveyed by wireless broadcasting systems, can suffer degradation associated with various transmission phenomena or channel conditions, such as co-channel interference, adjacent channel interference and/or weather-induced signal fading.

DETAILED DESCRIPTION

Figure 1:
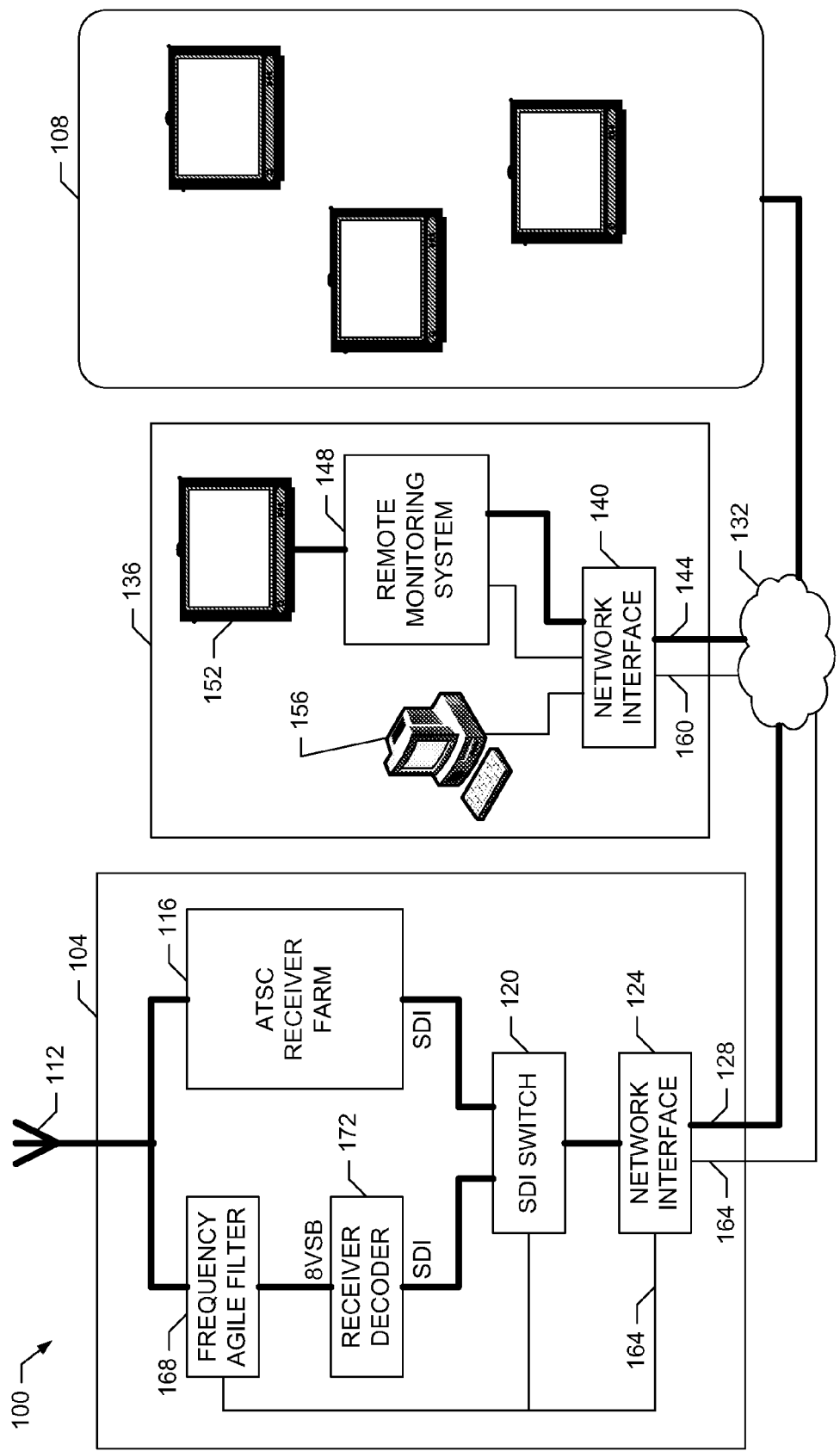
FIG. 1 is a block diagram of an example media broadcasting system employing frequency agile band-pass filtering according to the methods and/or apparatus described herein.

As discussed above, an Internet Protocol Television (IPTV) system typically employs a headend to receive Advanced Television Systems Committee (ATSC) broadcast signals on one or more broadcast channels and to redistribute received content via a digital Internet Protocol (IP) network. However, the received ATSC broadcast signals may suffer degradation due to various weather-related transmission phenomena. For example, unfavorable isobar conditions can cause a first ATSC broadcast channel to undergo degradation due to co-channel or adjacent channel interference from one or more other ATSC channels that are adjacent or near the first channel in the frequency domain. Additionally or alternatively, rain-induced signal fading may degrade the quality of an ATSC in a particular channel.

Typical prior art systems for receiving ATSC broadcast signals include a passive band pass filter requiring manual tuning and/or reconfiguration of its radio frequency (RF) reception parameters. These prior systems, therefore, typically require a human operator to be present in the vicinity of the band pass filter to perform any manual tuning and/or reconfiguration. However, in many operating scenarios, such as the example IPTV system mentioned above, the ATSC signal reception equipment is located in a headend that is physically separate from an operating center where personnel are located to perform network monitoring. In such scenarios, having a human operator co-located with the ATSC signal reception equipment at all times to perform manual tuning and/or reconfiguration of the RF parameters may not be cost effective or even feasible. Thus, many prior art systems are unable to compensate for the ATSC signal degradation due to fading and/or co-channel or adjacent channel interference caused by changing weather conditions.

In contrast, the methods and apparatus described herein allow remote configuration and control of parameters affecting ATSC signal reception to mitigate the fading and/or co-channel or adjacent channel interference experienced by ATSC broadcast signals during changing weather conditions. In particular, the methods and apparatus described herein are based on an example frequency agile band-pass filter capable of being tuned remotely to a particular ATSC broadcast channel. Additionally, the example frequency agile band-pass filter is capable of being configured remotely to provide a specified attenuation to the particular tuned ATSC broadcast channel, for example, to mitigate co-channel or adjacent channel interference. Additionally, in at least some example implementations, the example frequency agile band-pass filter is remotely controllable so that it may be bypassed or configured to be put in a pass-through mode remotely, for example, to mitigate rain-induced signal fading of the particular tuned ATSC broadcast channel. Such remote control could be performed manually by a human operator and/or automatically via software/hardware control. Thus, at least in some example implementations, the remote configuration and control capabilities of the example frequency agile band-pass filters described herein support cost-effective and potentially continuous monitoring and adjustment of ATSC signal reception to mitigate weather related and other types of signal degradation.

Although the example methods and apparatus described herein are presented in the context of ATSC broadcast signal reception in an IPTV system, these example methods and apparatus are not limited thereto. Instead, the example methods and apparatus described herein are readily adaptable for use in any type of broadcasting system and/or for reception of any type of broadcast signal and/or for any other similar type of use.

Turning to the figures, a block diagram of an example media broadcasting system 100 employing frequency agile band-pass filtering according to the methods and/or apparatus described herein is illustrated in FIG. 1. The example media broadcasting system 100 implements an IPTV system and includes an example headend 104 to receive media content from multiple sources for redistribution to a plurality of reception sites 108. The example reception sites 108 include any type of location and/or device capable of receiving IPTV broadcasts, such as one or more subscriber homes, businesses, etc., and/or one or more subscriber televisions, computers, portable multimedia devices (e.g., such as personal digital assistants (PDAs), MP3 players, multimedia-capable mobile phones, and the like), etc.

In the illustrated example, the example headend 104 (also known as a Video Headend Office or VHO) includes one or more antennas 112 and an ATSC receiver farm 116 to receive ATSC signals provided by one or more ATSC broadcast channels that are received by the antenna(s) 112 and passed to the ATSC receiver farm 116.

The antenna(s) 112 can be implemented using any type of antenna technology to receive over-the-air (OTA) ATSC transmissions. Additionally or alternatively, the antenna(s) 112 could also include or be replaced by one or more wired connections to receive the ATSC signals from one or more corresponding wired broadband sources (e.g., such as one or more cable providers, other IPTV providers, etc.).

The example ATSC receiver farm 116 can be implemented using one or more conventional or unconventional ATSC receivers. In the illustrated example, the ATSC receiver farm 116 is implemented using a plurality of ATSC receivers, each configured to receive radio frequency (RF) ATSC signals transmitted using 8-level vestigial sideband modulation (8VSB) on a respective ATSC broadcast channel. Each of the ATSC receivers in the example ATSC receiver farm 116 is further configured to demodulate its respective received 8VSB ATSC signal to produce a corresponding output audio/video signal conforming to the serial digital interface (SDI) format.

The example headend 104 further includes an example SDI switch 120 to route audio/video SDI signals to an example network interface 124 for redistribution to the example reception sites 108. In the illustrated example, the SDI switch 120 receives the demodulated audio/video SDI signal(s) output by the ATSC receiver(s) implementing the example ATSC receiver farm 116. The example SDI switch 120 may be implemented using any type of conventional or unconventional SDI switch, router, bridge, etc., configured to route the demodulated audio/video SDI signal(s) from the example ATSC receiver farm 116 to the example network interface 124. The example network interface 124, in turn, implements any appropriate audio/video encoding, compression, packetization, formatting, etc., to convert the SDI signal(s) received from the example SDI switch 120 into an IPTV broadcast signal 128 for distribution to the example reception sites 108 via an example IP network 132.

The example IP network 132 can be implemented using any type or combination or public and/or private IP networks. For example, the example IP network 132 can be implemented using one or more private IP access networks coupled to a public backbone IP network, such as the Internet. Alternatively, the example IP network 132 can be implemented using, for example, one or more private IP access networks and a private backbone IP network. Also, the example IP network 132 can be implemented using any type or combination of IP network technology. For example, the example IP network 132 can be implemented using a fiber-based broadband network, a cable broadband network, a wireless (e.g., mobile cellular) broadband network, a satellite broadband network, an Ethernet local area network, etc., or any combination thereof. Accordingly, the example network interface 124 is suitably configured to interface with the particular type or combination of IP technology implementing the example IP network 132.

To control operation and monitor performance of the example headend 104, the example media broadcast system includes an example operating center 136. The example operating center 136 (also known as a Video Operating Center or VOC) includes an example network interface 140 suitably configured to interface with the particular type or combination of IP technology implementing the example IP network 132. In the illustrated example, the example network interface 140 is used by the example operating center 136 to receive an IPTV broadcast signal 144 transmitted by the example headend 104. As discussed above, the example IPTV broadcast signal 144 includes one or more audio/video signals corresponding to the respective one or more ATSC broadcast signals received by the example headend 104 for redistribution in the example media broadcast system 100. In at least some example implementations, the example IPTV broadcast signal 144 may also include other media content from other media sources in addition to the one or more ATSC broadcast signals received by the example headend 104.

The example operating center 136 includes a remote monitoring system 148 and one or more monitors 152 to allow the quality of the IPTV broadcast signal 144 to be monitored. As such, the example remote monitoring system 148 and the example monitor(s) 152 also allow remote monitoring of the quality of the IPTV broadcast signal 128 output by the example headend 104 because there is little chance of additional error being introduced by the example IP network 132 coupling the example headend 104 to the example operating center 136. In the illustrated example, a human operator uses the example monitor(s) 152 to monitor the perceived quality of audio/video content provided by the received IPTV broadcast signal 144, including the audio/video corresponding to the ATSC signals received by the example headend 104. For example, a bank of monitors 152 may be used in which each monitor is configured to select the audio/video content corresponding to a respective ATSC broadcast channel received by the example headend 104. Additionally or alternatively, one or more of the example monitors 152 may be configured to cycle through (e.g., manually or automatically at a specified rate) the audio/video content corresponding to a respective plurality of ATSC broadcast channels, thereby reducing the number of monitors 152 needed in the example operating center 136 to monitor the received IPTV broadcast signal 144.

The example remote monitoring system 148 also provides objective monitoring capabilities in addition to the subjective monitoring of the perceived quality of the received IPTV broadcast signal 144 provided by an operator using the example monitor(s) 152. In the illustrated, the remote monitoring system 148 processes the received IPTV broadcast signal 144 to determine various performance metrics, such as signal strength, modulation quality, pixelation, co-channel or adjacent channel interference measurements, etc., representing the quality of each (or at least a subset) of the audio/video content signals included in the received IPTV broadcast signal 144. Accordingly, such performance metrics may be used to monitor the reception quality of the ATSC signals received by the example headend 104. In an example implementation, these types of monitoring/testing can be implemented using automated testing procedures. For example, the remote monitoring system 148 can be implemented by Scientific Atlanta's ROSA™ Network Management System.

To control operation of the example headend 104 from the example operating center 136, the example operating center 136 further includes one or more example operator workstations 156. In the illustrated example, the operator workstation 156 is configured to allow an operator to exchange digital information with the example headend 104 via a data communication path 160 from the example network interface 140. Although the data communication path 160 is shown as being implemented over the example IP network 132 in the illustrated example, the data communication 160 could also be implemented using any type of separate network connection, and/or a combination of the example IP network 132 and one or more separate network connections. Additionally, in the illustrated example, the remote monitoring system 148 is also able to exchange digital information with the example headend 104 via the data communication path 160. As such, in at least some example implementations, the operator workstation(s) 156 supports/(support) manual configuration and/or control of the example headend 104, and the example remote monitoring system 148 supports automatic configuration and/or control of the example headend 104.

In the illustrated example, the data communication path 160 implements one or more communication protocols to send configuration and/or control commands remotely from the example operating center 136 to the example headend 104. Additionally, in at least some example implementations, the data communication path 160 implements one or more communication protocols to receive command responses and/or other digital information remotely at the example operating center 136 from the example headend 104. In an example implementation, the data communication path 160 is implemented at least in part using the Simple Network Management Protocol (SNMP) to send SNMP commands from the example operating center 136 to the example headend 104 and to receive SNMP responses at the example operating center 136 from the example headend 104.

As a counterpart to the example data communication path 160, the example headend 104 is able to exchange digital information with the example operating center 136 via an example data communication path 164. Although the data communication path 164 is shown as being implemented over the example IP network 132 in the illustrated example, the data communication 164 could also be implemented using any type of separate network connection, and/or a combination of the example IP network 132 and one or more separate network connections. Similar to the example data communication path 160, the example data communication path 164 implements one or more communication protocols to receive configuration and/or control commands remotely at the example headend 104 from the example operating center 136. Additionally, in at least some example implementations, the data communication path 164 implements one or more communication protocols to send command responses and/or other digital information remotely to the example operating center 136 from the example headend 104. In an example implementation, the data communication path 164 is implemented at least in part using SNMP to receive SNMP commands at the example headend 104 from the example operating center 136 and to send SNMP responses from the example headend 104 to the example operating center 136.

In the illustrated example, the network interface 124 included in the example headend 104 couples the data communication path 164 to the example SDI switch 120 and an example frequency agile band-pass filter 168. The example frequency agile band-pass filter 168 is included in the example headend 104 to mitigate weather related and/or other types of signal degradation experienced by the ATSC broadcast signals received by the example headend 104. In the illustrated example, the data communication path 164 coupled to the example frequency agile band-pass filter 168 allows the example operating center 136 to tune the example frequency agile band-pass filter 168 remotely to a particular ATSC broadcast channel determined by the operating center 136 to be experiencing one or more forms of signal degradation. Additionally, as discussed in greater detail below, the data communication path 164 coupled to the example SDI switch 120 allows an ATSC broadcast signal processed by the example frequency agile band-pass filter 168 to be selected remotely to replace the unprocessed version of the ATSC signal received by the example ATSC receiver farm 116.

For example, the example remote monitoring system 148 and/or an operator observing the example monitor(s) 152 may determine that the audio/video content corresponding to a particular ATSC broadcast channel is experiencing degradation associated with co-channel or adjacent channel interference, signal fading, etc. For example, a particular ATSC broadcast channel may be determined to be undergoing degradation due to co-channel or adjacent channel interference when the example monitor 152 tuned to the affected ATSC channel displays the audio/video content corresponding to the tuned ATSC channel overlaid and/or interleaved with audio/video content corresponding to another ATSC channel. As another example, the particular ATSC broadcast channel may be determined to be undergoing degradation due to signal fading when the example monitor 152 tuned to the affected ATSC channel displays pixelation in and/or a dropout of the audio/video content corresponding to the tuned ATSC channel. Additionally or alternatively, the example remote monitoring system 148 may be configured to determine one or more performance metrics consistent with the co-channel or adjacent channel interference and/or signal fading characteristics described above.

In response to determining that a particular ATSC broadcast channel is experiencing signal degradation, the example remote monitoring system 148 and/or an operator using the example operator workstation 156 may send one or more commands (e.g., SNMP commands) remotely to the example headend 104 via the data communication paths 160 and 164. The one or more commands may be used to tune the example frequency agile band-pass filter 168 to the affected ATSC channel and/or to configure the example frequency agile band-pass filter 168 to mitigate the detected signal degradation(s) as discussed in greater detail above. The resulting processed 8VSB ATSC signal output by the frequency agile band-pass filter 168 is provided to an example receiver/decoder 172 for demodulation to produce a corresponding output audio/video signal conforming to the SDI format.

Next, the resulting filtered audio/video SDI signal output by the example receiver/decoder 172 is applied to an input of the example SDI switch 120, which is configurable remotely by the example remote monitoring system 148 and/or a human operating using the example operator workstation 156 via one or more commands (e.g., SNMP commands) sent remotely to the example headend 104 over the data communication paths 160 and 164. In particular, the example SDI switch can be configured remotely to route the filtered audio/video SDI signal output by the example receiver/decoder 172 to the example network interface 124 for inclusion in the IPTV broadcast signal 128 instead of an unprocessed (e.g., unfiltered) version corresponding to the same ATSC signal received by the example ATSC receiver farm 116.

As illustrated in FIG. 1, the example media broadcast system 100 employs the example frequency agile band-pass filter 168 at a centralized location, the example headend 104, to mitigate degradation experienced by one or more received ATSC channels prior to redistribution to a plurality of reception sites 108. In some example implementations, multiple example frequency agile band-pass filters 168 and corresponding example receiver/decoders 172 may be included in the example headend 104 to allow multiple ATSC signals to be processed in parallel. In other example implementations, the example ATSC receiver farm 116 may include one or more example frequency agile band-pass filters 168, with each filter being configured to support a respective ATSC receiver or group of ATSC receivers in the ATSC receiver farm 116. Furthermore, one or more example operating centers 136 may be used to monitor the reception quality of the ATSC channels received at the headend 104. In the event that one or more such ATSC channels are determined to be experience signal degradation, the example operating center(s) 136 can configure the example frequency agile band-pass filter(s) 168 to process the affected ATSC channels to mitigate the signal degradation and, thus, improve signal reception quality.

Figure 2:
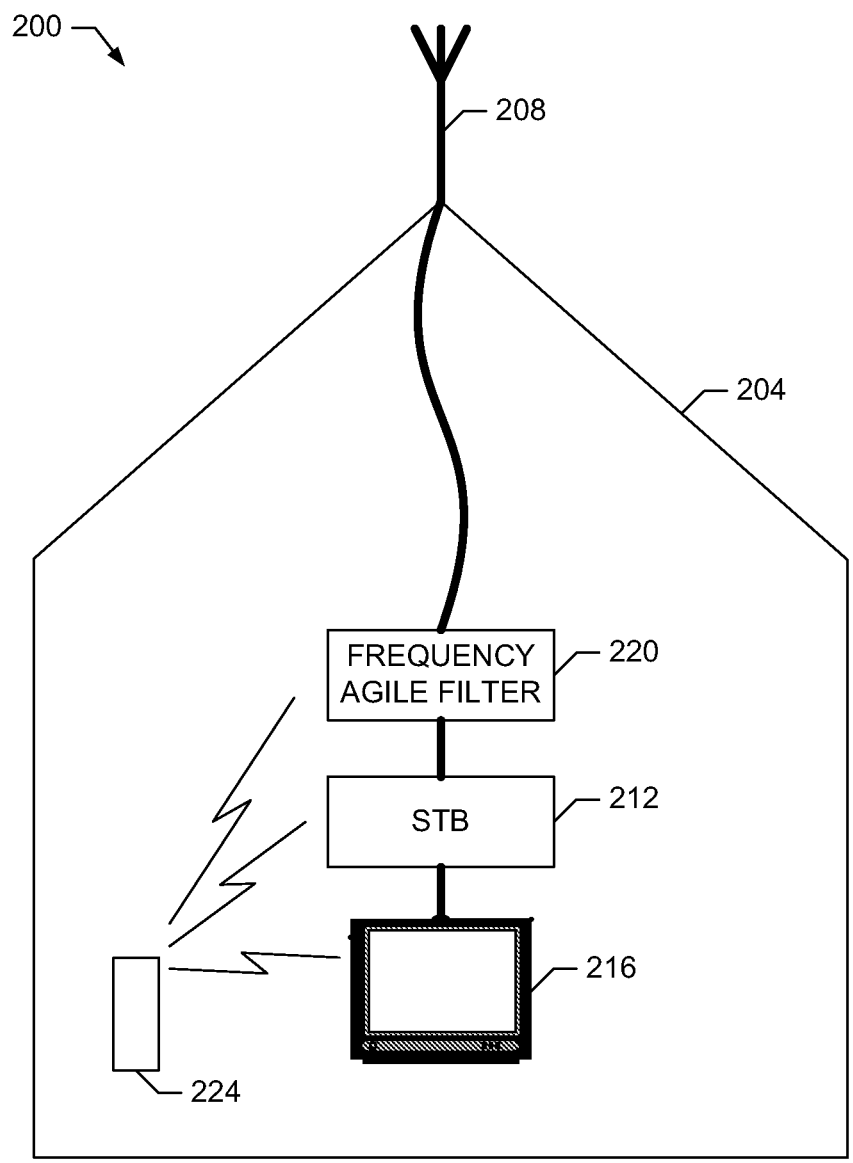
FIG. 2 is a block diagram of an example media broadcast receiving system employing frequency agile band-pass filtering according to the methods and/or apparatus described herein.

A block diagram of an example media broadcast receiving system 200 employing frequency agile band-pass filtering according to the methods and/or apparatus described herein is illustrated in FIG. 2. In contrast with the centralized use of frequency agile band-pass filtering demonstrated in the example media broadcast system 100 of FIG. 1, the example media broadcast receiving system 200 of FIG. 2 demonstrates a distributed implementation in which frequency agile band-pass filtering is employed at each (or at least a subset of) the reception sites (e.g., such as the reception sites 108) of an IPTV system. For the sake of simplicity, and without loss of generality, a single example reception site 204 is depicted in the example of FIG. 2. However, the example media broadcast receiving system 200 could be implemented in any number of reception sites 202, for example, to mitigate signal degradation detected in broadcast signals received in a media broadcast system.

Turning to FIG. 2, the example media broadcast receiving system 200 includes an antenna 208 suitably implemented to receive OTA ATSC signals provided by one or more ATSC broadcast channels. Additionally or alternatively, the antenna 208 could also include or be replaced by one or more wired connections to receive the ATSC signals from one or more corresponding wired broadband sources (e.g., such as one or more cable providers, other IPTV providers, etc.). In the illustrated example, the antenna 208 provides received ATSC signals to a home entertainment system including an example set-top box 212 and an example presentation device 216. The components of the home entertainment system, including the example set-top box 212 and the example presentation device 216, may be connected in any manner including that shown in FIG. 2. Additionally, the example media broadcast receiving system 200 includes an example frequency agile band-pass filter 220 to couple the output of the example antenna 208 to the example set-top box 212 and the example presentation device 216. In some example implementations, the example frequency agile band-pass filter 220 may be integrated into the example set-top box 212 and/or the example presentation device 216.

The example set-top box 212 may be any set-top box, such as an IPTV converter, a cable television converter, a direct broadcast satellite (DBS) decoder, a video cassette recorder (VCR), etc. The example set-top box 212 receives a plurality of broadcast channels and/or media content selections from a corresponding media source (not shown), such as an IPTV broadcasting system, a cable television broadcasting system, a DBS broadcasting system, etc. Additionally, the example STB 212 includes an ATSC receiver to receive a plurality of ATSC broadcast channels using the example antenna 208 coupled to the STB 212 via the example frequency agile band-pass filter 220. In an example implementation, to receive content provided by an ATSC broadcast channel, the ATSC receiver included in the example set-top box 212 tunes to one of the plurality of ATSC broadcast channels based on a user input, and outputs one or more demodulated audio/video signals received via the selected ATSC broadcast channel. For some home entertainment systems, such as those in which the example antenna 208 is the only media source or in which the example reception site 204 also subscribes to basic analog cable television service, the set-top box 212 may not be present as its function (e.g., including its ATSC receiver functionality) is performed by a tuner in the example presentation device 216. In such an example implementation, the frequency agile band-pass filter 220 is coupled to the example presentation device 216.

The example presentation device 216 may be any type of television set and/or media display device. For example, the presentation device 216 may be a television and/or display device that supports an ATSC standard, such as high definition television (HDTV), the National Television Standards Committee (NTSC) standard, the Phase Alternating Line (PAL) standard, the Système Électronique pour Couleur avec Mémoire (SECAM) standard, a standard developed by the Digital Video Broadcasting (DVB) Project, or may be a multimedia computer system, etc.

The example media broadcast receiving system 200 also includes a remote control device 224 to transmit control information that may be received by any or all of the example set-top box 212, the example presentation device 216 and the example frequency agile band-pass filter 220. The remote control device 224 may transmit this information using a variety of techniques, including, but not limited to, a wireless connection, such as an infrared (IR) transmission, a radio frequency (RF) transmission, etc., and/or a wired/cabled connection, and/or the like. Furthermore, in the illustrated example, the remote control device 224 is configured to send one or more configuration and/or control commands to the example frequency agile band-pass filter 220.

Similar to the example frequency agile band-pass filter 168 of FIG. 1, the example frequency agile band-pass filter 220 is included in the example media broadcast receiving system 200 to mitigate weather related and/or other types of signal degradation experienced by the ATSC broadcast signals received via the example antenna 208. In particular, the example frequency agile band-pass filter 220 can be tuned and/or configured to process a particular ATSC broadcast channel determined to be experiencing one or more forms of signal degradation. Such tuning and/or configuration can be performed using one or more control and/or configuration commands sent by the example remote control device 224 to the example frequency agile band-pass filter 220.

For example, a viewer of the example presentation device 216 may perceive that a particular tuned ATSC channel is experiencing degradation due to co-channel or adjacent channel interference when the example presentation device 216 displays audio/video content corresponding to the tuned ATSC channel overlaid and/or interleaved with other audio/video content corresponding to another ATSC channel. Additionally or alternatively, the viewer may perceive that the particular tuned ATSC channel is experiencing degradation due to signal fading when the example presentation device 216 displays pixelation in and/or a dropout of the audio/video content corresponding to the tuned ATSC channel. In response to perceiving such degradation, the viewer may use the example remote control device 224 to send one or more commands to the example frequency agile band-pass filter 220 causing the example frequency agile band-pass filter 220 to tune to the affected ATSC channel and/or perform certain specified processing discussed in greater detail below to mitigate the perceived signal degradation(s).

Figure 3:
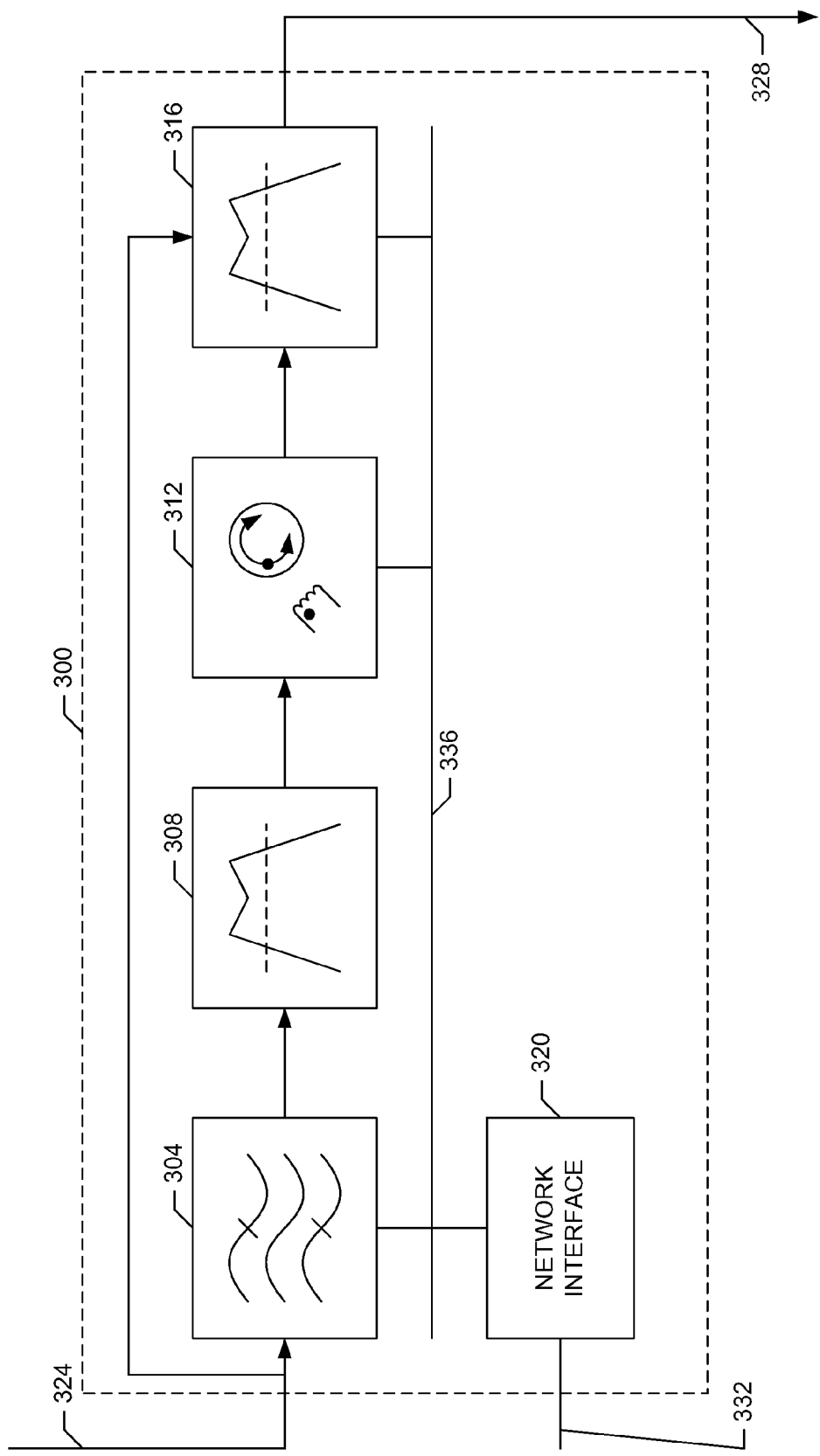
FIG. 3 is a block diagram of an example frequency agile band-pass filter that may be used to implement the example media broadcasting system of FIG. 1 and/or the example media broadcast receiving system of FIG. 2.

A block diagram of an example frequency agile band-pass filter 300 that may be used to implement the example frequency agile band-pass filter 168 of FIG. 1 and/or the example frequency agile band-pass filter 220 of FIG. 2 is illustrated in FIG. 3. The example frequency agile band-pass filter 300 includes a tunable radio frequency (RF) preselector 304, a fixed bandwidth band-pass filter 308, a variable attenuator 312, an output stage 316 and a network interface 320. The example preselector 304 is coupled to an RF input 324 of the example frequency agile band-pass filter 300. In the illustrated example, the RF input 324 is configured to receive a plurality of ATSC channels from an RF source (e.g., such as the example antenna(s) 112 of FIG. 1 or the example antenna 208 of FIG. 2). The example preselector 304 is tunable to a particular ATSC channel received via the RF input 324 according one or more preselector configuration commands received by the example network interface 320. For example, the one or more preselector configuration commands may be used to specify a particular ATSC channel number and/or center carrier frequency to which the example preselector 304 is to be tuned. In the illustrated example, the example preselector 304 outputs the tuned ATSC channel at a fixed, predetermined intermediate frequency.

The example fixed bandwidth band-pass filter 308 is coupled to the example preselector 304 to receive a signal corresponding to the tuned ATSC channel tuned. Because the example preselector 304 outputs the tuned ATSC channel at a fixed, predetermined intermediate frequency, the example fixed bandwidth band-pass filter 308 can be implemented to have a fixed center frequency corresponding to the fixed, predetermined intermediate frequency of the output of the example preselector 304. Additionally, the example fixed bandwidth filter 308 has a fixed bandwidth corresponding to the bandwidth of an ATSC channel. In the illustrated example, the bandwidth of the example fixed bandwidth band-pass filter 308 is 6 megahertz (MHz), the bandwidth of an ATSC channel. Furthermore, the example fixed bandwidth band-pass filter 308 may be implemented using any type of passive and/or active filter topology to yield any desired passband and/or roll-off characteristics. In the illustrated example, the example fixed bandwidth band-pass filter 308 is designed to pass the tuned ATSC channel and attenuate the other ATSC channels received via the RF input 324.

The example variable attenuator 312 is coupled to the example fixed bandwidth band-pass filter 308 to receive the filtered ATSC channel. The example variable attenuator 312 is configured to attenuate the filtered ATSC channel output by the example fixed bandwidth band-pass filter 308 according one or more attenuator configuration commands received by the example network interface 320. For example, the one or more attenuator configuration commands may be used to specify a particular signal attenuation (e.g., in decibels (dB)) to be applied to the filtered ATSC channel. Additionally or alternatively, the one or more attenuator configuration commands may be used to specify an incremental attenuation increase or decrease to be applied to the filtered ATSC channel. In the latter case, the one or more attenuator configuration commands may also be used to specify an attenuation step size for adjusting the attenuation provided by the example variable attenuator 312 in response to a specified incremental attenuation increase or decrease.

The example output stage 316 is coupled to the example variable attenuator 312 to allow the processing performed by the example preselector 304, the example fixed bandwidth band-pass filter 308 and/or the example variable attenuator 312 to be bypassed according to one or more output stage configuration commands received by the example network interface 320. In the illustrated example, the output stage 316 is configured to either pass the processed ATSC channel output by the example variable attenuator 312 to an RF output 328 of the example frequency agile band-pass filter 300 or bypass all of the filter processing and shunt the RF input 324 to the RF output 328. Accordingly, in the illustrated example the one or more output stage configuration commands may be used to specify whether the processed ATSC channel output by the example variable attenuator 312 or the RF input 324 should be provided at the RF output 328 (e.g., with the default being the processed ATSC channel output by the example variable attenuator 312). In another example implementation, the example output stage 316 is supplied with the outputs of the example preselector 304 and the example fixed bandwidth band-pass filter 308, as well as the output of the example variable attenuator 312 as in the illustrated example, to allow the ATSC channel signal output by any one of these processing blocks to be provided at the RF output 328. In such an example implementation, the one or more output stage configuration commands may be used to specify which processing block output should be provided at the RF output 328 (e.g., with the default being the processed ATSC channel output by the example variable attenuator 312).

The example network interface 320 is coupled to a control input 332 of the example frequency agile band-pass filter 300 to receive one or more configuration commands to control operation of the example frequency agile band-pass filter 300. The example network interface 320 is further coupled to an example communication bus 336 to provide the received configuration command(s) (after appropriate processing, reformatting, etc., as needed) to and/or otherwise configure the example preselector 304, the example variable attenuator 312 and/or the example network stage 320. For example, the network interface 320 may include an SNMP interface to receive, for example, one or more preselector SNMP commands to control (e.g., tune) the example preselector 304, one or more attenuator SNMP commands to configure a specific attenuation, an incremental attenuation and/or an attenuation step size for the example variable attenuator 312, and/or one or more output stage SNMP commands to configure pass-through or bypass operation of the example output stage 316. Accordingly, in such an example implementation the SNMP interface included in the example network interface 320 may further include an Ethernet interface and an IP protocol stack to interface with a data network (e.g., such as the data communication path 164 of FIG. 1) to receive the SNMP command(s) from a remote site (e.g., such as the example operating center 136 of FIG. 1).

Additionally or alternatively, the network interface 320 may include a wireless network interface, such as an IR and/or RF network interface, to receive, for example, one or more preselector IR and/or RF commands to control (e.g., tune) the example preselector 304, one or more attenuator IR and/or RF commands to configure a specific attenuation, an incremental attenuation and/or an attenuation step size for the example variable attenuator 312, and/or one or more output stage IR and/or RF commands to configure pass-through or bypass operation of the example output stage 316. Accordingly, in such an example implementation the wireless network interface included in the example network interface 320 may include an IR interface and/or an RF interface to communicate with a remote control (e.g., such as the example remote control 224 of FIG. 2) to receive the wireless control/configuration commands from a user.

In an example operation of the frequency agile band-pass filter 300, the network interface 320 receives commands to control/configure the frequency agile band-pass filter 300 to mitigate degradation experienced by a particular one of the plurality of ATSC channels received at the RF input 324. For example, upon determining/perceiving that the particular ATSC channel is experiencing degradation, the example network interface 320 may receive one or more commands (e.g., SNMP command(s) from a remote site, IR or RF commands from a remote control, etc.) to tune the example preselector 304 to the affected ATSC channel. If the degradation is determined/perceived to be associated with co-channel or adjacent channel interference (e.g., as described above), the example network interface 320 may receive one or more commands (e.g., SNMP command(s) from a remote site, IR or RF commands from a remote control, etc.) to increase the attenuation applied to the tuned ATSC channel by the example variable attenuator 312. If the tuned ATSC channel is determined/perceived to be undergoing a signal fading condition (e.g., as described above), the example network interface 320 may receive one or more commands (e.g., SNMP command(s) from a remote site, IR or RF commands from a remote control, etc.) to cause the example output stage 316 to bypass some or all of the processing performed by the example frequency agile band-pass filter 300, for example, to increase the amplitude/power of the affected ATSC channel at the RF output 316. Additional commands may be sent to and received by the example network interface 320 as the degradation experienced by the tuned ATSC channel changes and/or as other ATSC channels are determined/perceived to be undergoing signal degradation.

Although depicted and described for use in processing ATSC channels, the example frequency agile band-pass filter 300 may be readily adapted to process many other types of signals. For example, with relatively straightforward modification of the tuning capability of the example preselector 304 and the bandwidth of the example fixed bandwidth band-pass filter 308, the example frequency agile band-pass filter 300 could be adapted for receive and process digital broadcast satellite (DBS) channels, amplitude modulated (AM) radio broadcast channels, frequency modulated (FM) radio broadcast channels, satellite radio broadcast channels, etc.

While an example manner of implementing the example frequency agile band-pass filter 300 has been illustrated in FIG. 3, one or more of the elements, processes and/or devices illustrated in FIG. 3 may be combined, divided, re-arranged, omitted, eliminated and/or implemented in any other way. Further, the example preselector 304, the example fixed bandwidth band-pass filter 308, the example variable attenuator 312, the example output stage 316, the example network interface 320 and/or, more generally, the example frequency agile band-pass filter 300 of FIG. 3 may be implemented by hardware, software, firmware and/or any combination of hardware, software and/or firmware. Thus, for example, any of the example preselector 304, the example fixed bandwidth band-pass filter 308, the example variable attenuator 312, the example output stage 316, the example network interface 320 and/or, more generally, the example frequency agile band-pass filter 300 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example frequency agile band-pass filter 300, the example preselector 304, the example fixed bandwidth band-pass filter 308, the example variable attenuator 312, the example output stage 316 and/or the example network interface 320 are hereby expressly defined to include a tangible medium such as a memory, digital versatile disk (DVD), compact disk (CD,) etc., storing such software and/or firmware. Further still, the example frequency agile band-pass filter 300 of FIG. 3 may include one or more elements, processes and/or devices in addition to, or instead of, those illustrated in FIG. 3, and/or may include more than one of any or all of the illustrated elements, processes and devices.

Figure 4:
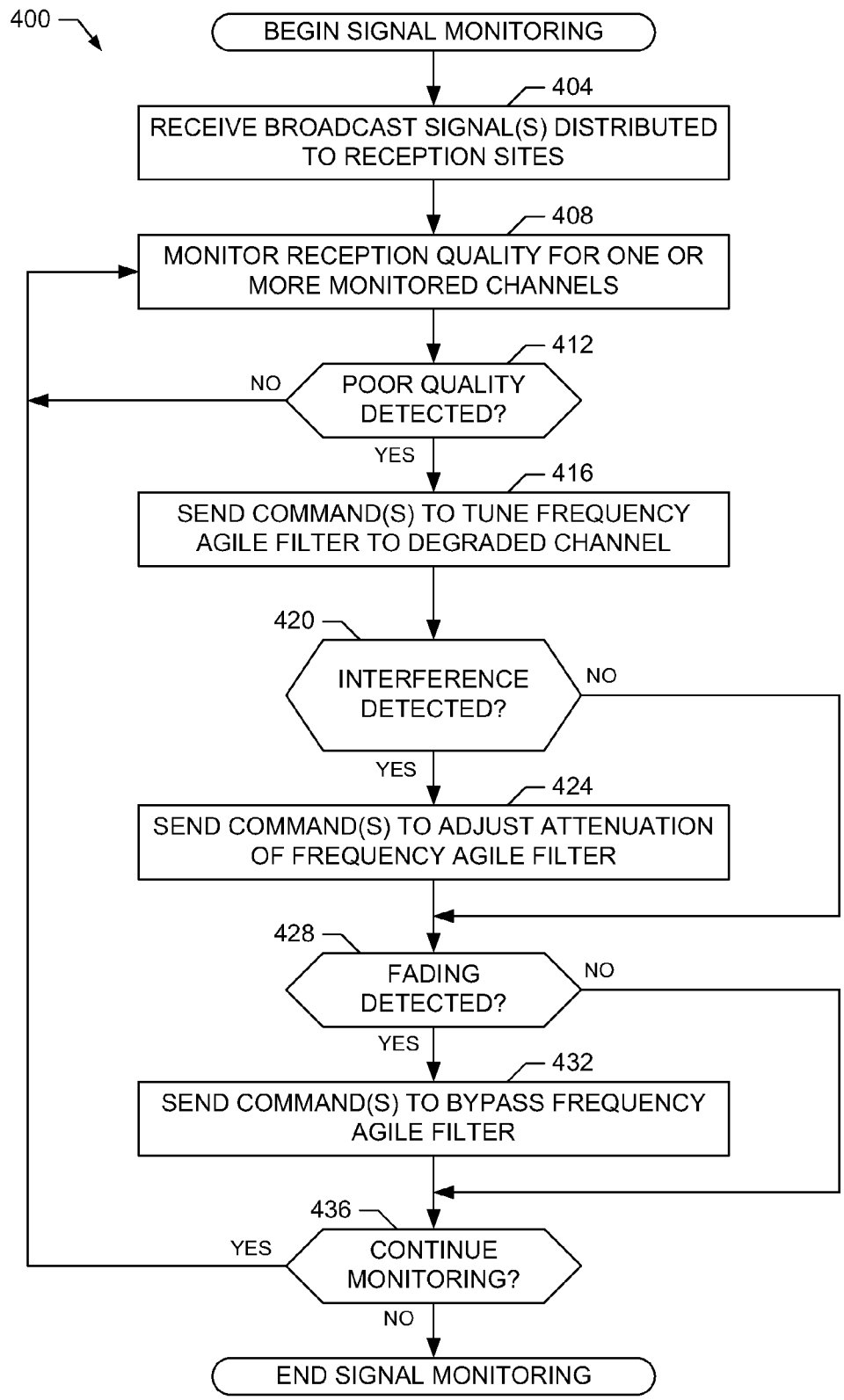
FIG. 4 is a flowchart representative of an example signal monitoring process that may be performed to implement the example media broadcasting system of FIG. 1 and/or the example media broadcast receiving system of FIG. 2.
Figure 5:
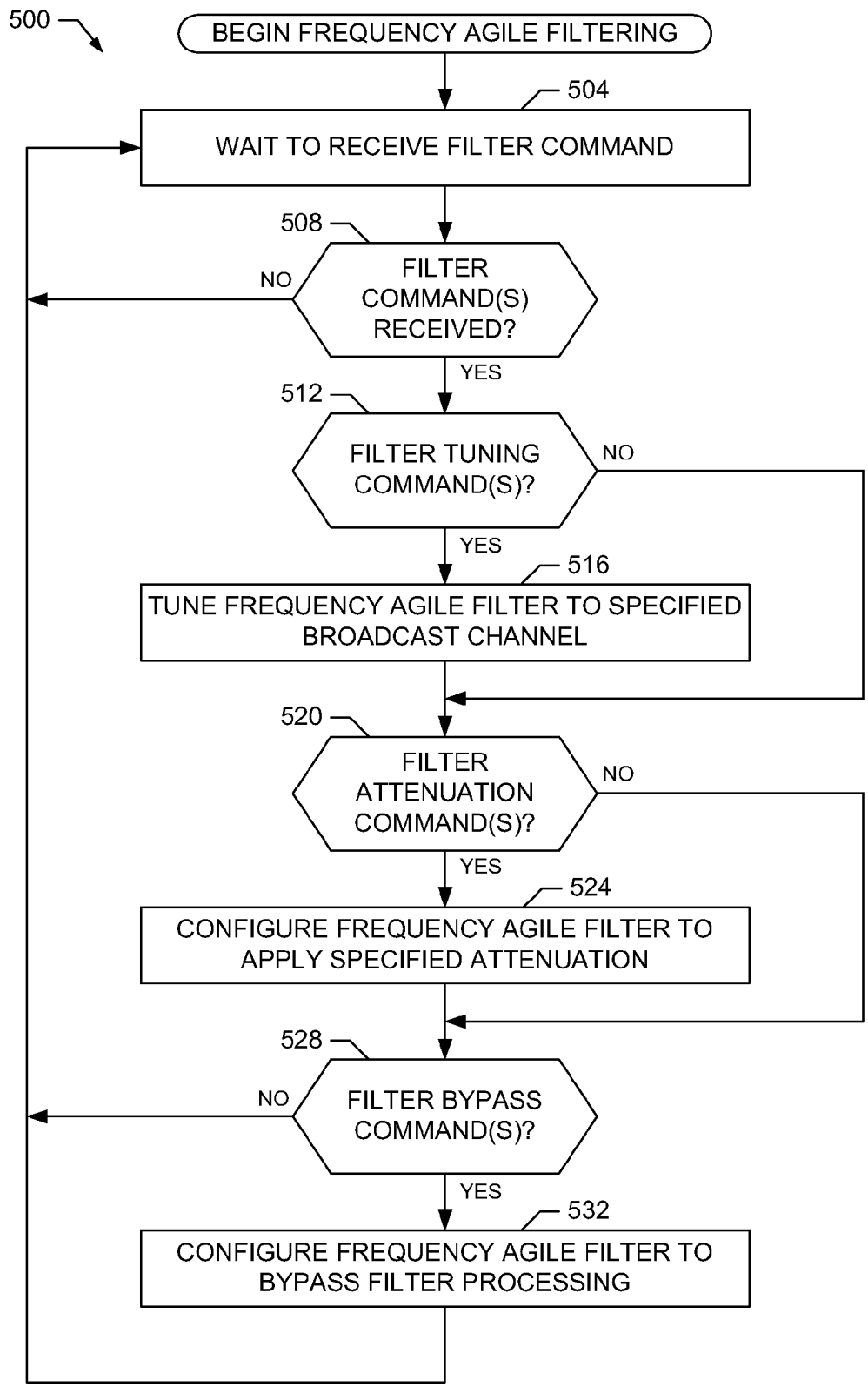
FIG. 5 is a flowchart representative of an example frequency agile filtering process that may be performed to implement the example media broadcasting system of FIG. 1, the example media broadcast receiving system of FIG. 2 and/or the example frequency agile band-pass filter of FIG. 3.

Flowcharts representative of example processes that may be executed to implement the example media broadcasting system 100, the example headend 104, the example operating center 136, the example frequency agile band-pass filter 168, the example media broadcast receiving system 200, the example frequency agile band-pass filter 220, the example frequency agile band-pass filter 300 the example preselector 304, the example fixed bandwidth band-pass filter 308, the example variable attenuator 312, the example output stage 316 and/or the example network interface 320 are shown in FIGS. 4-5. In these examples, the process represented by each flowchart may be implemented by one or more programs comprising machine readable instructions for execution by: (a) a processor, such as the processor 612 shown in the example computer 600 discussed below in connection with FIG. 6, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 612, but the entire program or programs and/or portions thereof could alternatively be executed by a device other than the processor 612 and/or embodied in firmware or dedicated hardware (e.g., implemented by an application specific integrated circuit (ASIC), a programmable logic device (PLD), a field programmable logic device (FPLD), discrete logic, etc.). For example, any or all of the example media broadcasting system 100, the example headend 104, the example operating center 136, the example frequency agile band-pass filter 168, the example media broadcast receiving system 200, the example frequency agile band-pass filter 220, the example frequency agile band-pass filter 300 the example preselector 304, the example fixed bandwidth band-pass filter 308, the example variable attenuator 312, the example output stage 316 and/or the example network interface 320 could be implemented by any combination of software, hardware, and/or firmware. Also, some or all of the processes represented by the flowcharts of FIGS. 4-5 may be implemented manually. Further, although the example processes are described with reference to the flowcharts illustrated in FIGS. 4-5, many other techniques for implementing the example methods and apparatus described herein may alternatively be used. For example, with reference to the flowcharts illustrated in FIGS. 4-5, the order of execution of the blocks may be changed, and/or some of the blocks described may be changed, eliminated, combined and/or subdivided into multiple blocks.

An example process 400 that may be executed to implement signal monitoring in the example media broadcasting system 100 of FIG. 1 and/or the example media broadcast receiving system 200 of FIG. 2 is illustrated in FIG. 4. The example monitoring process 400 may be executed continuously, at predetermined intervals, based on an occurrence of a predetermined event (e.g., such as when a particular ATSC channel is selected/tuned for reception), etc., or any combination thereof. The example monitoring process 400 begins execution at block 404 at which one or more broadcast signals being distributed to a plurality of reception sites are received. For example, at block 404 the example operating center 136 of the example media broadcasting system 100 may receive a plurality of ATSC broadcast signals corresponding to a respective plurality of ATSC broadcast channels received via the IPTV broadcast signal 144. As another example, at block 404 the example reception site 204 may receive the plurality of ATSC broadcast signals via the antenna 208.

After receiving the broadcast signal(s) at block 404, control proceeds to block 408 at which the reception quality of at least some of the received broadcast signal(s) is monitored. For example, at block 408 the example remote monitoring system 148 and/or an operator viewing the example monitor(s) 152 may monitor the reception quality of some or all of the plurality of ATSC channels receivable at the example operating center 136. In another example, a viewer at the example reception site 204 may monitor the reception quality of a particular ATSC channel to which the example set-top box 212 and/or the example presentation device 216 is tuned. Next, at block 412, if poor reception quality (e.g., signal degradation) is not detected, control returns to block 408 at which reception quality monitoring continues. However, if poor reception quality (e.g., signal degradation) is detected (block 412), control proceeds to block 416.

At block 416, one or more commands are sent to a frequency agile band-pass filter to tune the filter to the particular ATSC channel experiencing the detected poor reception quality (e.g., detected signal degradation). For example, at block 416 the example remote monitoring system 148 and/or an operator using the example operator workstation 156 may send one or more SNMP commands to the example headend 104 to tune the example frequency agile band-pass filter 168 to the ATSC channel experiencing poor reception quality. As another example, at block 416 a viewer may use the example remote control device 224 to send one or more IR and/or RF commands to tune the example frequency agile band-pass filter 220 to the ATSC channel experiencing poor reception quality.

Next, control proceeds to block 420 at which the characteristics of the detected poor reception quality (e.g., detected signal degradation) are evaluated to determine how to configure the frequency agile band-pass filter to mitigate the poor reception (e.g., signal degradation). In particular, at block 420 characteristics associated with co-channel or adjacent channel interference are evaluated. For example, at block 420 a display of the audio/video content corresponding to the particular ATSC channel may be evaluated to determine whether it is overlaid by or interleaved with another ATSC channel's audio/video content, thereby indicating that the particular ATSC channel is experiencing co-channel or adjacent channel interference. Such evaluation may be performed by the example remote monitoring system 148 and/or an operator observing the example monitor 152 in the context of the example media broadcast system 100, or a viewer in the context of the example media broadcast receiving system 200.

If the poor signal quality (e.g., signal degradation) of the particular ATSC channel exhibits characteristics associated with co-channel or adjacent channel interference (block 420), control proceeds to block 424 at which one or more commands are sent to a frequency agile band-pass filter to specify an attenuation to be applied to the tuned ATSC channel. For example, at block 424 the example remote monitoring system 148 and/or an operator using the example operator workstation 156 may send one or more SNMP commands to the example headend 104 to specify an attenuation to be applied by the example frequency agile band-pass filter 168 to the ATSC channel experiencing poor reception quality. As another example, at block 424 the viewer may use the example remote control device 224 to send one or more IR and/or RF commands to specify the attenuation to be applied by the example frequency agile band-pass filter 220 to the ATSC channel experiencing poor reception quality. In these examples, the command(s) sent to the frequency agile band-pass filter may specify, for example, a particular (e.g., absolute) signal attenuation (e.g., in decibels (dB)), an incremental attenuation increase or decrease, an attenuation step size associated with the incremental attenuation increase or decrease, etc.

After processing at block 424 completes, or if the particular ATSC channel does not exhibit characteristics associated with co-channel or adjacent channel interference (block 420), control proceeds to block 428. At block 428, characteristics of poor reception quality (e.g., detected signal degradation) associated with signal fading are evaluated. For example, at block 428 a display of the audio/video content corresponding to the particular ATSC channel may be evaluated to determine whether it exhibits pixelation and/or dropout, thereby indicating that the particular ATSC channel is experiencing signal fading. Such evaluation may be performed by the example remote monitoring system 148 and/or an operator observing the example monitor 152 in the context of the example media broadcast system 100, or a viewer in the context of the example media broadcast receiving system 200.

If the poor signal quality (e.g., signal degradation) of the particular ATSC channel exhibits characteristics associated with signal fading (block 428), control proceeds to block 432 at which one or more commands are sent to a frequency agile band-pass filter to cause some or all of the filter processing to be bypassed, thereby increasing the signal strength (e.g., amplitude/power) of the particular ATSC channel. For example, at block 432 the example remote monitoring system 148 and/or an operator using the example operator workstation 156 may send one or more SNMP commands to the example headend 104 to cause the example frequency agile band-pass filter 168 to bypass its processing of the ATSC channel experiencing poor reception quality. As another example, at block 432 the viewer may use the example remote control device 224 to send one or more IR and/or RF commands to cause the example frequency agile band-pass filter 220 to bypass its processing of the ATSC channel experiencing poor reception quality.

After processing at block 432 completes, or if the particular ATSC channel does not exhibit characteristics associated with signal fading (block 428), control proceeds to block 436 to determine whether signal monitoring should continue. If a determination is made that signal monitoring should continue (block 436), control returns to block 404 and blocks subsequent thereto to allow signal monitoring to continue. Otherwise, the example monitoring process 400 ends.

An example filtering process 500 that may be executed to implement the example frequency agile band-pass filter 168 of FIG. 1, the example frequency agile band-pass filter 220 of FIG. 2 and/or the example frequency agile band-pass filter 300 of FIG. 3 is illustrated in FIG. 5. The example filtering process 500 may be executed continuously, at predetermined intervals, based on an occurrence of a predetermined event (e.g., such as when a particular ATSC channel is selected for reception), etc., or any combination thereof. For the sake of simplicity, and without loss of generality, execution of the example filtering process 500 is described in the context of the example frequency agile band-pass filter 300. The example filtering process 500 begins execution at block 504 at which the example network interface 320 waits to receive one or more commands to control/configure the example frequency agile band-pass filter 300. As discussed above, the received commands may be SNMP commands, IR commands, RF commands, etc., or any combination thereof. If at block 508 the example network interface 320 detects one or more received commands, control proceeds to block 512. Otherwise, control returns to block 504.

At block 512 and blocks subsequent thereto, the example network interface 320 determines which one or more commands have been received by the example frequency agile band-pass filter 300. For example, a single command may be received by the example network interface 320 to control/configure a single operation of the example frequency agile band-pass filter 300. Alternatively, a group of multiple commands may be received to control/configure one or more operations of the example frequency agile band-pass filter 300. In the illustrated example, at block 512 the example network interface 320 determines whether the received command(s) include one or more filter tuning commands. For example, a filter tuning command may specify a particular ATSC channel and/or a particular center carrier frequency to which the example preselector 304 is to be tuned. If the received command(s) include one or more filter tuning commands (block 512), control proceeds to block 516 at which the example network interface 320 sends one or more configuration commands and/or uses any other appropriate technique to configure the example preselector 304 to tune to the ATSC channel and/or center carrier frequency specified by the received filter tuning commands.

Next, control proceeds to block 520 at which the example network interface 320 determines whether the received command(s) include one or more filter attenuation commands. For example, a filter attenuation command may specify a specific attenuation, incremental attenuation and/or attenuation step size for the example variable attenuator 312 to apply to the particular ATSC channel to which the example frequency agile band-pass filter 300 is tuned. If the received command(s) include one or more filter attenuation commands (block 520), control proceeds to block 524 at which the example network interface 320 sends one or more configuration commands and/or uses any other appropriate technique to configure the example variable attenuator 312 to provide a specified particular (e.g., absolute) signal attenuation (e.g., in decibels (dB)) or an incremental attenuation increase or decrease according to a predefined or specified attenuation step size.

Next, control proceeds to block 528 at which the example network interface 320 determines whether the received command(s) include one or more filter bypass commands. For example, a filter bypass command may specify that some or all of the processing performed by the example frequency agile band-pass filter 300 should be bypassed by the example output stage 316 (e.g., to increase signal strength in the presence of signal fading). If the received command(s) include one or more filter bypass commands (block 528), control proceeds to block 532 at which the example network interface 320 sends one or more configuration commands and/or uses any other appropriate technique to configure the example output stage 316 to bypass the processing performed by the example preselector 304, the example fixed bandwidth band-pass filter 308 and/or the example variable attenuator 312 as specified by the received filter bypass command(s). Then, after processing at block 532 completes, control returns to block 504 at which the example network interface 320 waits for additional command(s) to be received by the example frequency agile band-pass filter 300.

Figure 6:
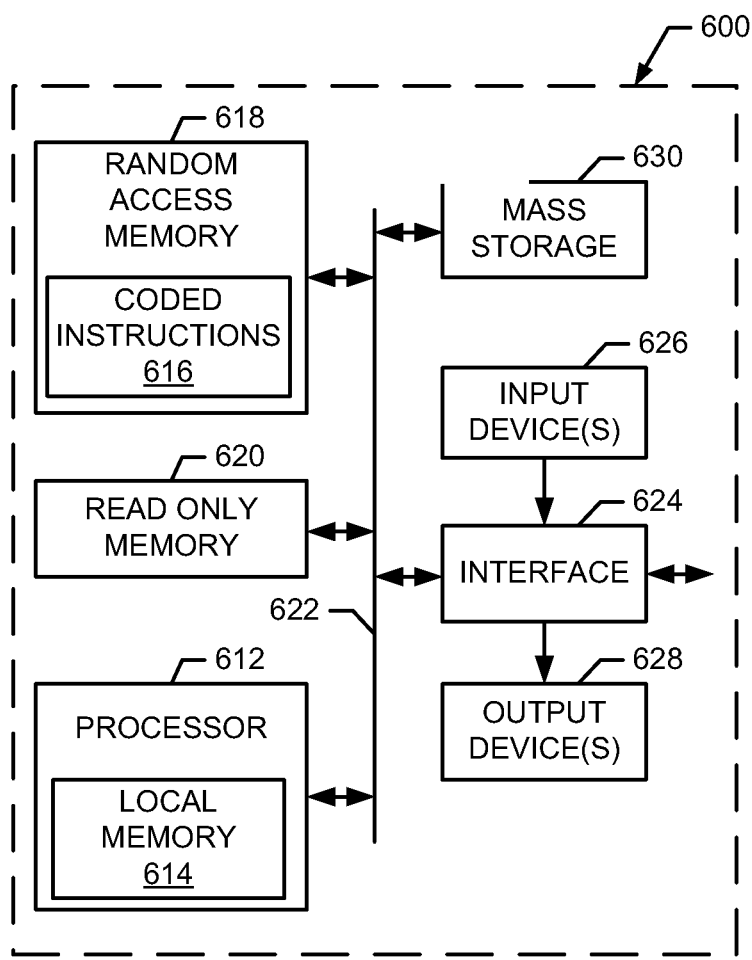
FIG. 6 is a block diagram of an example computer that may execute example machine readable instructions used to implement some or all of the processes of FIGS. 4 and/or 5 to implement the example media broadcasting system of FIG. 1, the example media broadcast receiving system of FIG. 2 and/or the example frequency agile band-pass filter of FIG. 3.

FIG. 6 is a block diagram of an example computer 600 capable of implementing the apparatus and methods disclosed herein. For example, the computer 600 may be used to implement the example operator workstation(s) 156. The computer 600 can be, for example, a server, a personal computer, a personal digital assistant (PDA), an Internet appliance, a DVD player, a CD player, a digital video recorder, a personal video recorder, a set top box, or any other type of computing device.

The system 600 of the instant example includes a processor 612 such as a general purpose programmable processor. The processor 612 includes a local memory 614, and executes coded instructions 616 present in the local memory 614 and/or in another memory device. The processor 612 may execute, among other things, machine readable instructions to implement the processes represented in FIGS. 4-5. The processor 612 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 612 is in communication with a main memory including a volatile memory 618 and a non-volatile memory 620 via a bus 622. The volatile memory 618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 620 may be implemented by flash memory and/or any other desired type of memory device. Access to the main memory 618, 620 is typically controlled by a memory controller (not shown).

The computer 600 also includes an interface circuit 624. The interface circuit 624 may be implemented by any type of interface standard, such as an Ethernet interface, a universal serial bus (USB), and/or a third generation input/output (3GIO) interface.

One or more input devices 626 are connected to the interface circuit 624. The input device(s) 626 permit a user to enter data and commands into the processor 612. The input device(s) can be implemented by, for example, a keyboard, a mouse, a touchscreen, a track-pad, a trackball, an isopoint and/or a voice recognition system.

One or more output devices 628 are also connected to the interface circuit 624. The output devices 628 can be implemented, for example, by display devices (e.g., a liquid crystal display, a cathode ray tube display (CRT)), by a printer and/or by speakers. For example, one or more of the output devices 628 may be used to implement the monitor(s) 152. The interface circuit 624, thus, typically includes a graphics driver card.

The interface circuit 624 also includes a communication device such as a modem or network interface card to facilitate exchange of data with external computers via a network (e.g., an Ethernet connection, a digital subscriber line (DSL), a telephone line, coaxial cable, a cellular telephone system, etc.). For example, the interface circuit 624 may be used to implement the example network interface 124, the example network interface 140 and/or the example network interface 320.

The computer 600 also includes one or more mass storage devices 630 for storing software and data. Examples of such mass storage devices 630 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for media broadcast signal reception and distribution, the method comprising:
    monitoring reception quality of at least some of a plurality of channels included in a media broadcast signal received at a headend, the headend including a frequency agile band-pass filter to receive the media broadcast signal for distribution to a plurality of reception sites;
    sending, via a processor, a first set of commands over a communication network to the frequency agile band-pass filter to cause the frequency agile band-pass filter to tune to and attenuate a first channel included in the media broadcast signal, the first set of commands being sent in response to determining that the first channel is experiencing a degradation of reception quality determined to be caused by a first type of channel interference;
    remotely commanding, via the processor, a switch at the headend to replace a first output signal from a first receiver providing the first channel for distribution to the plurality of reception sites with a second output signal from a second receiver processing an output of the frequency agile band-pass filter; and
    sending, via the processor, a subsequent second set of commands over the communication network to the frequency agile band-pass filter to override attenuation processing invoked by the first set of commands, the subsequent second set of commands to cause the attenuation processing by the frequency agile band-pass filter to be bypassed during reception of the first channel, the second set of commands being sent in response to determining that the degradation of reception quality is being caused by fading in addition to the first type of channel interference.

2. The method as defined in claim 1, wherein the first type of channel interference comprises co-channel interference.

3. The method as defined in claim 1, wherein the first type of channel interference comprises adjacent channel interference.

4. The method as defined in claim 1, further comprising determining that the first channel is experiencing degradation caused by the first type of channel interference when an overlap of two video signals in a video display corresponding to the first channel is detected.

5. The method as defined in claim 1, further comprising determining that the first channel is experiencing degradation caused by fading when pixelation in a video display corresponding to the first channel is detected.

6. The method as defined in claim 1, wherein the frequency agile band-pass filter comprises:
    a tunable preselector that is tunable according to a first set of configuration commands receivable from a communication network;
    a fixed bandwidth band-pass filter in communication with an output of the tunable preselector; and
    a variable attenuator in communication with an output of the fixed bandwidth band-pass filter, the variable attenuator to provide variable attenuation according to a second set of configuration commands receivable via the communication network.

7. The method as defined in claim 1, wherein the headend further comprises a plurality of frequency agile band-pass filters tunable independently to at least a subset of the plurality of channels.

8. A tangible machine readable storage medium device comprising machine readable instructions which, when executed, cause a machine to perform operations comprising:

monitoring reception quality of at least some of a plurality of channels included in a media broadcast signal received at a headend, the headend including a frequency agile band-pass filter to receive the media broadcast signal for distribution to a plurality of reception sites;

sending a first set of commands over a communication network to the frequency agile band-pass filter to cause the frequency agile band-pass filter to tune to and attenuate a first channel included in the media broadcast signal, the first set of commands being sent in response to determining that the first channel is experiencing a degradation of reception quality determined to be caused by a first type of channel interference;

remotely commanding a switch at the headend to replace a first output signal from a first receiver providing the first channel for distribution to the plurality of reception sites with a second output signal from a second receiver processing an output of the frequency agile band-pass filter; and sending a subsequent second set of commands over the communication network to the frequency agile band-pass filter to override attenuation processing invoked by the first set of commands, the subsequent second set of commands to cause the attenuation processing by the frequency agile band-pass filter to be bypassed during reception of the first channel, the second set of commands being sent in response to determining that the degradation of reception quality is being caused by fading in addition to the first type of channel interference.

9. The storage device as defined in claim 8, wherein the first type of channel interference comprises co-channel interference.

10. The storage device as defined in claim 8, wherein the first type of channel interference comprises adjacent channel interference.

11. The storage device as defined in claim 8, wherein the operations further comprise determining that the first channel is experiencing degradation caused by the first type of channel interference when an overlap of two video signals in a video display corresponding to the first channel is detected.

12. The storage device as defined in claim 8, wherein the operations further comprise determining that the first channel is experiencing degradation caused by fading when pixelation in a video display corresponding to the first channel is detected.

13. The storage device as defined in claim 8, wherein the frequency agile band-pass filter comprises:

a tunable preselector that is tunable according to a first set of configuration commands receivable from a communication network;

a fixed bandwidth band-pass filter in communication with an output of the tunable preselector; and a variable attenuator in communication with an output of the fixed bandwidth band-pass filter, the variable attenuator to provide variable attenuation according to a second set of configuration commands receivable via the communication network.

14. The storage device as defined in claim 8, wherein the headend further comprises a plurality of frequency agile band-pass filters tunable independently to at least a subset of the plurality of channels.

15. An apparatus comprising:

a memory having machine readable instructions stored thereon; and a processor to execute the instructions to perform operations comprising:

monitoring reception quality of at least some of a plurality of channels included in a media broadcast signal received at a headend, the headend including a frequency agile band-pass filter to receive the media broadcast signal for distribution to a plurality of reception sites;

sending a first set of commands over a communication network to the frequency agile band-pass filter to cause the frequency agile band-pass filter to tune to and attenuate a first channel included in the media broadcast signal, the first set of commands being sent in response to determining that the first channel is experiencing a degradation of reception quality determined to be caused by a first type of channel interference;

remotely commanding a switch at the headend to replace a first output signal from a first receiver providing the first channel for distribution to the plurality of reception sites with a second output signal from a second receiver processing an output of the frequency agile band-pass filter;

sending a subsequent second set of commands over the communication network to the frequency agile band-pass filter to override attenuation processing invoked by the first set of commands, the subsequent second set of commands to cause the attenuation processing by the frequency agile band-pass filter to be bypassed during reception of the first channel, the second set of commands being sent in response to determining that the degradation of reception quality is being caused by fading in addition to the first type of channel interference.

16. The apparatus as defined in claim 15, wherein the first type of channel interference comprises co-channel interference.

17. The apparatus as defined in claim 15, wherein the first type of channel interference comprises adjacent channel interference.

18. The apparatus as defined in claim 15, wherein the operations further comprise determining that the first channel is experiencing degradation caused by the first type of channel interference when an overlap of two video signals in a video display corresponding to the first channel is detected.

19. The apparatus as defined in claim 15, wherein the operations further comprise determining that the first channel is experiencing degradation caused by fading when pixelation in a video display corresponding to the first channel is detected.

20. The apparatus as defined in claim 15, wherein the frequency agile band-pass filter comprises:

a tunable preselector that is tunable according to a first set of configuration commands receivable from a communication network;

a fixed bandwidth band-pass filter in communication with an output of the tunable preselector; and a variable attenuator in communication with an output of the fixed bandwidth band-pass filter, the variable attenuator to provide variable attenuation according to a second set of configuration commands receivable via the communication network.

* * * * *